(No Model.)

E. J. FISK.
WHEEL.

No. 462,247. Patented Nov. 3, 1891.

Witnesses:
Walter S. Wood
Marian Longyear

Inventor.
Earle J. Fisk
By Lucius C. West
Att'y.

UNITED STATES PATENT OFFICE.

EARLS J. FISK, OF ALMENA, MICHIGAN.

WHEEL.

SPECIFICATION forming part of Letters Patent No. 462,247, dated November 3, 1891.

Application filed January 16, 1891. Serial No. 378,024. (No model.)

*To all whom it may concern:*

Be it known that I, EARLS J. FISK, a citizen of the United States, residing at Almena, county of Van Buren, State of Michigan, have invented a new and useful Vehicle-Wheel, of which the following is a specification.

This invention relates to that class of wheels which have grooves or channels between the tire and the felly for the insertion of oil to prevent the felly and spokes from becoming loose, or to cause said parts to swell in case they have already shrunk and loosened the tire, and thereby "set" the tire again.

The object consists in the peculiar construction of the wheel-rim, in the relation of the channel and hole to fill the same, and the plug for stopping said hole.

Figure 1:
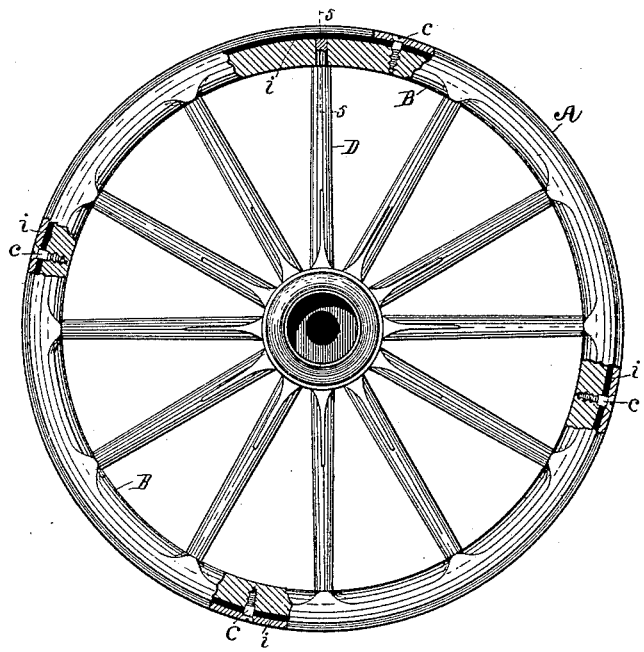
Figure 2:
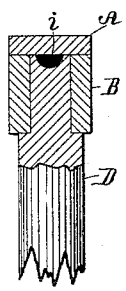
Figure 3:
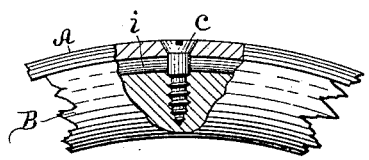
Figure 4:
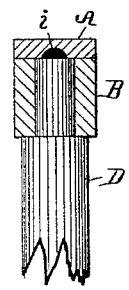

In the drawings forming a part of this specification, Figure 1 is an elevation of a wheel. Figs. 2 and 4 are enlarged sections on lines 5 5 in Fig. 1, and Fig. 3 shows enlarged broken details from Fig. 1.

Referring to the lettered parts of the drawings, A is the tire of the wheel, B the felly, and D the spokes.

At $i$ is shown the peripheral channel beneath the tire and around the wheel. This channel may be formed in the felly itself, Fig. 3, or in the underside of the tire A, Fig. 4. In Fig. 2 the channel $i$ is shown cut through the end of the spoke D, so as to make the channel continuous when made in the felly.

At C are screw-plugs, which pass through the tire and into the felly, but not through the latter, so that no oil can leak through the felly. These screw-plugs may be arranged around the rim and serve two purposes—viz., to hold the tire on and to plug up the holes through which the oil is inserted into the channel. When arranged to fasten the tire, the upper and lower plug may be both removed and water or other liquid be inserted into the upper hole and allowed to escape out of the lower hole in cleaning out the channel $i$. By using a screw-plug in this manner the hole through the tire is closed tight and kept so, because the threaded screw draws so firmly on the wooden felly that no oil can leak out.

Having thus described my invention, what I claim as new, and desire to secure by Letters Patent of the United States, is—

A wheel having a channel around the felly and beneath the tire, holes leading through the tire for the insertion of oil, and screw-plugs passed through the tire-holes, through the channel, and screwed into the felly, but not extending entirely through the same, substantially as set forth.

In testimony to the foregoing I have hereunto subscribed my name in the presence of two witnesses.

EARLS J. FISK.

Witnesses:
L. N. BURKE,
EDITH PERKINS.